US 6,628,414 B1

United States Patent
Gabrielsen et al.

(10) Patent No.: US 6,628,414 B1
(45) Date of Patent: Sep. 30, 2003

(54) METHOD FOR HANDLING LONG DELAYS IN TELECOMMUNICATION SYSTEMS

(75) Inventors: Stein-Ole Gabrielsen, Hosle (NO); Ole-Martin Sæther, Asker (NO); Eldor Rødseth, Asker (NO); Fredrik Høyer, Oslo (NO); Staffan Lindvall, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/158,026

(22) Filed: Sep. 21, 1998

(30) Foreign Application Priority Data

Aug. 27, 1998 (NO) .................................. 983948

(51) Int. Cl.[7] ................................. H04N 1/00
(52) U.S. Cl. ....................... 358/1.15; 358/434; 358/442; 370/235
(58) Field of Search ............... 358/1.15, 403, 358/407, 425, 434, 435, 442, 443, 468; 370/310, 536, 235, 236

(56) References Cited

U.S. PATENT DOCUMENTS

| 5,031,179 A | * | 7/1991 | Yoshida et al. ............. 714/748 |
| 5,491,565 A | * | 2/1996 | Naper ........................ 358/468 |
| 5,561,844 A | * | 10/1996 | Jayapalan et al. .......... 455/442 |
| 5,726,764 A | * | 3/1998 | Averbuch et al. ........... 358/403 |
| 5,742,639 A | * | 4/1998 | Fasulo, II et al. .......... 375/219 |
| 5,790,641 A | * | 8/1998 | Chan et al. ............. 379/100.17 |
| 5,805,301 A | * | 9/1998 | Rasanen ...................... 358/425 |
| 5,877,871 A | * | 3/1999 | Smith et al. ................. 358/442 |
| 5,878,036 A | * | 3/1999 | Spartz et al. ............... 370/335 |
| 5,881,064 A | * | 3/1999 | Lin et al. .................... 370/395 |
| 5,953,647 A | * | 9/1999 | Patel et al. ................. 455/343 |
| 6,038,037 A | * | 3/2000 | Leung et al. ............... 358/434 |
| 6,081,534 A | * | 6/2000 | Sipila ......................... 370/466 |
| 6,115,142 A | * | 9/2000 | Leung ........................ 358/434 |
| H1880 H | * | 10/2000 | Vines et al. ................ 370/310 |
| 6,147,978 A | * | 11/2000 | John et al. .................. 370/279 |

FOREIGN PATENT DOCUMENTS

| WO | WO 92/02100 | * | 2/1992 |
| WO | WO 95/22224 | | 8/1995 |
| WO | WO 97/02697 | | 1/1997 |

* cited by examiner

*Primary Examiner*—Edward Coles
*Assistant Examiner*—Joseph R. Pokrzywa
(74) *Attorney, Agent, or Firm*—Jenkens & Gilchrist, P.C.

(57) ABSTRACT

The present invention relates to a method for handling long delays in telecommunication systems, especially in connection with transparent fax services in telecom systems wherein a Global System for Mobile commmunication (GSM) is used, and wherein is used at least one Fax Adaptor/Inter Working Function (FA/IWF), and for the purpose of improving such a telecom system in relation to prior art solutions, it is according to the present invention suggested that said method involves changes in said at least one FA/IWF only. More specifically, the method involves sending of T.30 signals (command or response) towards either of the communication links, only when the associated algorithm has detected a safe period.

7 Claims, 5 Drawing Sheets

METHOD FOR HANDLING LONG DELAYS IN TELECOMMUNICATION SYSTEMS

FIELD OF THE INVENTION

The present invention relates to a method for handling long delays in telecommunication systems.

More specifically, the invention relates to a method as stated in the preamble of the enclosed patent claim 1.

Figure 1:
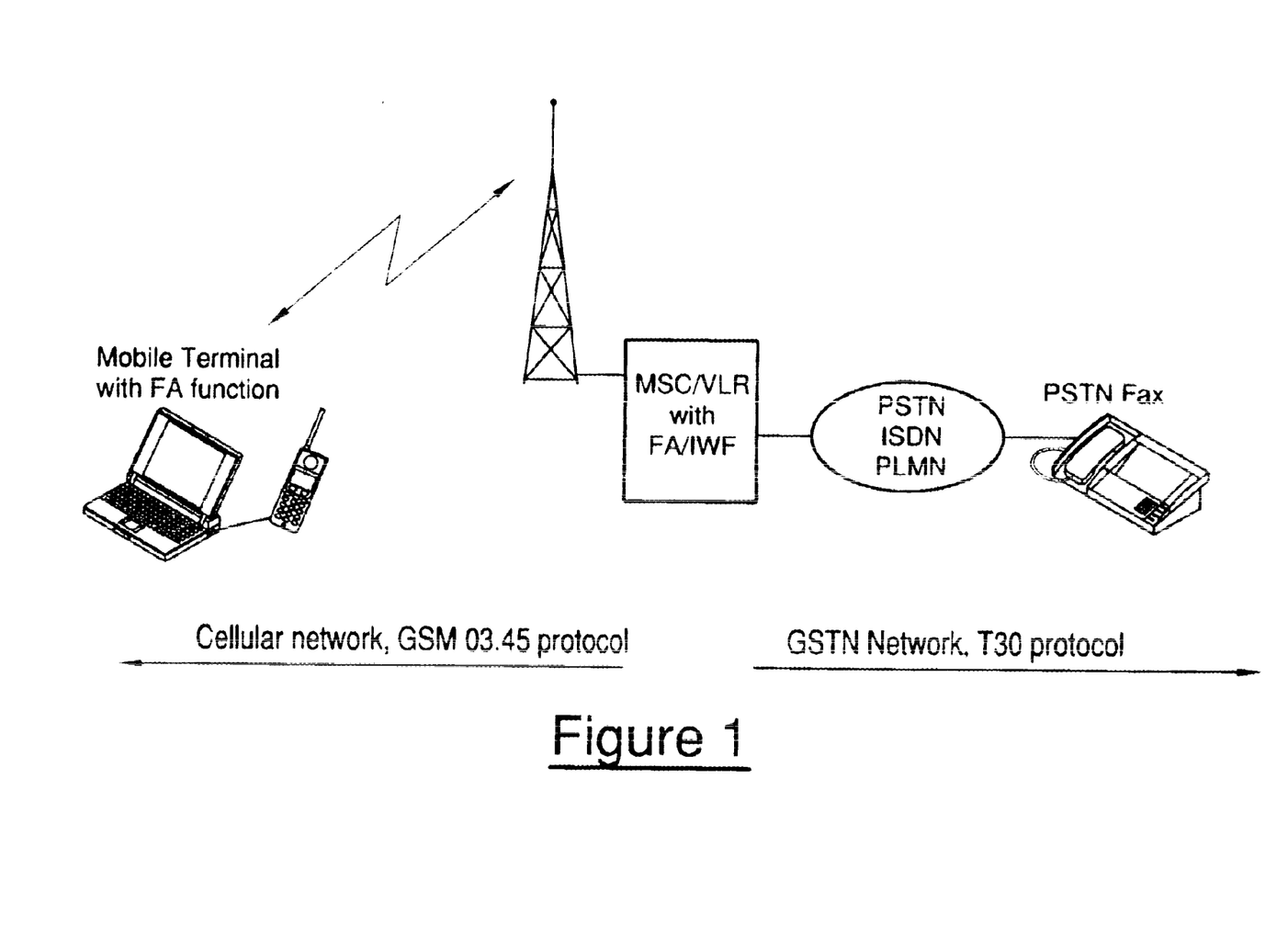
FIG. 1 illustrates a telecommunication system in which there is used mobile to fixed network interworking, in which telecommunication system there is used at least one FA/IWF.

Further, this invention can be applied to the usage of transparent fax services in telecom systems with long delays, and where a GSM based infrastructure is used, as this is illustrated in FIG. 1.

TECHNICAL BACKGROUND

The Problem Area

This invention solves the problem with long delay in fax transmissions where a GSM based infrastructure is used.

The introduction of transparent fax in modern telecom systems with long delay has proved an unpredictable behaviour of many of the existing fax entities. The main problem is that the fax protocol (ITU-T Recommendation T.30) was specified in times when long delays during set-up and transmission periods would be a sign of unreliable connection. Hence, the timers defined in the protocol are set to very rigid values. In addition, the timer values are fixed, reducing the possibility of tuning the communication. This will in many cases impose protocol time-outs, signal collisions and finally call-disconnect. In addition, since the protocol runs end-to-end, the delay will accumulate along the path.

More detailed, two major problems in fax transmissions with long delay are identified below:

1. A command is sent from a transmitting terminal (calling fax), and when it is received by a receiving terminal (call fax), an appropriate response is transmitted by the called fax. If the calling fax fails to receive an appropriate valid response within a 3 s±15%, it will repeat the command. If the total round-trip delay in the system exceeds 3 s, the calling fax will retransmit the command at the same time as the response is being sent from the called fax, resulting in signal crash.
2. The other main problem is also associated with time-out. This time, when one of the fax machines is waiting for a command. If no command has been received within 6 s±1 s (T.30 section 5.4.3.1, Time-out T2), the call will be disconnected. When the total delay in the system increases, the possibility for T2 timeout will also increase.

Another reason for unpredictable behaviour by some fax machines, is due to varying interpretation of T.30 and ambiguity in the recommendation itself. The list below illustrates examples of unexpected behaviour of some fax machines:

Some (old) fax machines terminate the call upon reception of the CRP signal.

Some (old) fax machines require 2 DIS commands before they reply.

Some fax machines requires 2 MPS/EOP commands before they reply.

Some PC cards repeat a command after (3 s–length of command) instead of the standard 3 s period.

KNOWN SOLUTIONS

1. In WO 92/02100 (Motorola) a strategy to enforce repeated transmissions is presented. The method uses the optional T.30 signal, CRP (Command Repeat), to reset the critical timers and enforce a retransmission before the actual timeout.
2. To prevent facsimile timeouts, WO 95/2224 presents a method where a holding signal is sent after a period T1. After a further period T2, a command repeat signal is sent to request for a repetition of the transmitted signal if the called terminal has failed to response.
3. Another known method is based on the assumption that the total connection between the two fax machines are divided in at least two separate connections by an interceptor which includes the implementation of a Fax Adaptor. Furthermore, the interceptor is both a fax receiver and a fax transmitter tied together by internal communication and buffers the entire fax transmission to be forwarded later.
4. Yet another strategy is to anticipate the response from the receiver of a command and send a "qualified guess" response to the issuer of the command. The idea is to keep the command issuer happy and within its time limits.
5. The last known solution is a method that is implemented both in the FA/IWF and in the FA/MT. The basic principle of the method is to run the protocol as transparently as possible until a signal crash is detected. When signal crash is detected, regeneration and ignoring of signals are performed in a symmetrical manner in both FA implementations. In addition, a special air interface protocol is utilised.

PROBLEMS WITH KNOWN SOLUTIONS

The main problem with the method presented in WO 92/02100 is that the CRP signal is used also as a request for repetition of a response. This is a problem since T.30 has no general rules for requesting repetition of a response. In addition, some old fax machines do not support the CRP signal at all. Another problem with the method is the possibility of the CRP signal being corrupted or lost on the air interface. The method assumes that the CRP signal always is received and is therefore vulnerable to CRP signal loss and corruption. Similar problems also exist for the method presented in WO 95/22224.

The drawback with the third approach is that it is not straightforward to implement, since it besides solving the delay problems adds a few major problems of other types. In addition, it is an expensive method.

The problem related to response anticipation is that the method assumes that fax vendors interpret the T.30 recommendation the same way in situations that T.30 originally did not foresee. When problems occur, recovery action must take place. However, it is not straightforward to identify recovery actions that are applicable to every problem with the response anticipation method.

The problem with the last method is that implementations on both sides are required. Hence, such a method is expensive and will only apply if an MT with this non-standardised FA implementation is available.

OBJECTS OF THE INVENTION

A main object of the present invention is to provide an improved method which is not hampered with the disadvantages as stated in connection with known solutions.

SUMMARY OF THE INVENTION

These objects are achieved in a method as stated in the preamble, which according to the present invention is characterised by the features as stated in the characterising clause of the enclosed patent claim 1.

In other words, the invention propose a solution based upon changes in at least one FA/IWF only.

More specifically, the present method involves sending of T.30 signals (command or response) towards either of the communication links, only when the associated algorithm has detected a safe period.

Further features and advantages of the present invention will appear from the following description taken in conjunction with the enclosed drawings, as well as from the enclosed patent claims.

DETAILED DESCRIPTION OF EMBODIMENTS

In FIG. 1 there is schematically illustrated a telecommunication system wherein the present method can be used, said telecommunication system allowing transparent fax services wherein a Global System for Mobile Communication (GSM) is used, and wherein is used at least one FA/IWF.

For mobile to mobile calls there would effectively be a loop back within the PLMN, using two IWFs.

This proposed solution is based upon changes in at least one FA/IWF only. The idea is to ensure that T.30 signals (command or response) are sent towards either of the communication links, only when the algorithm has detected a safe period. A safe period is defined as the period when no signal crash will occur if the FA/IWF starts transmitting a T.30 signal to a communication link. Due to the restriction defined in section 5.2.3.2 in GSM recommendation 03.45, "information received from GSM-TCH is ignored while CT109 (local modem) is in the ON condition"; the safe period concept also applies to the full duplex GSM channel.

The solution of finding a safe period is to buffer a T.30 signal received from fax A and pass it on to fax B when a retransmitted T.30 signal has been received and ignored from fax B. Furthermore, the T.30 recommendation differs between commands and responses. Once the transmitting and receiving terminals have been identified, all commands are initiated by the transmitting terminal and solicit an appropriate response from the receiving terminal. Furthermore, if the transmitting terminal does not receive an appropriate valid response within 3 s±15%, it will repeat the command. Hence, the idea is to buffer the response and pass it on to the transmitting terminal when the retransmitted command has been received and ignored. The transmitting terminal will then receive the response long before the retransmission time relapses.

Figure 2:
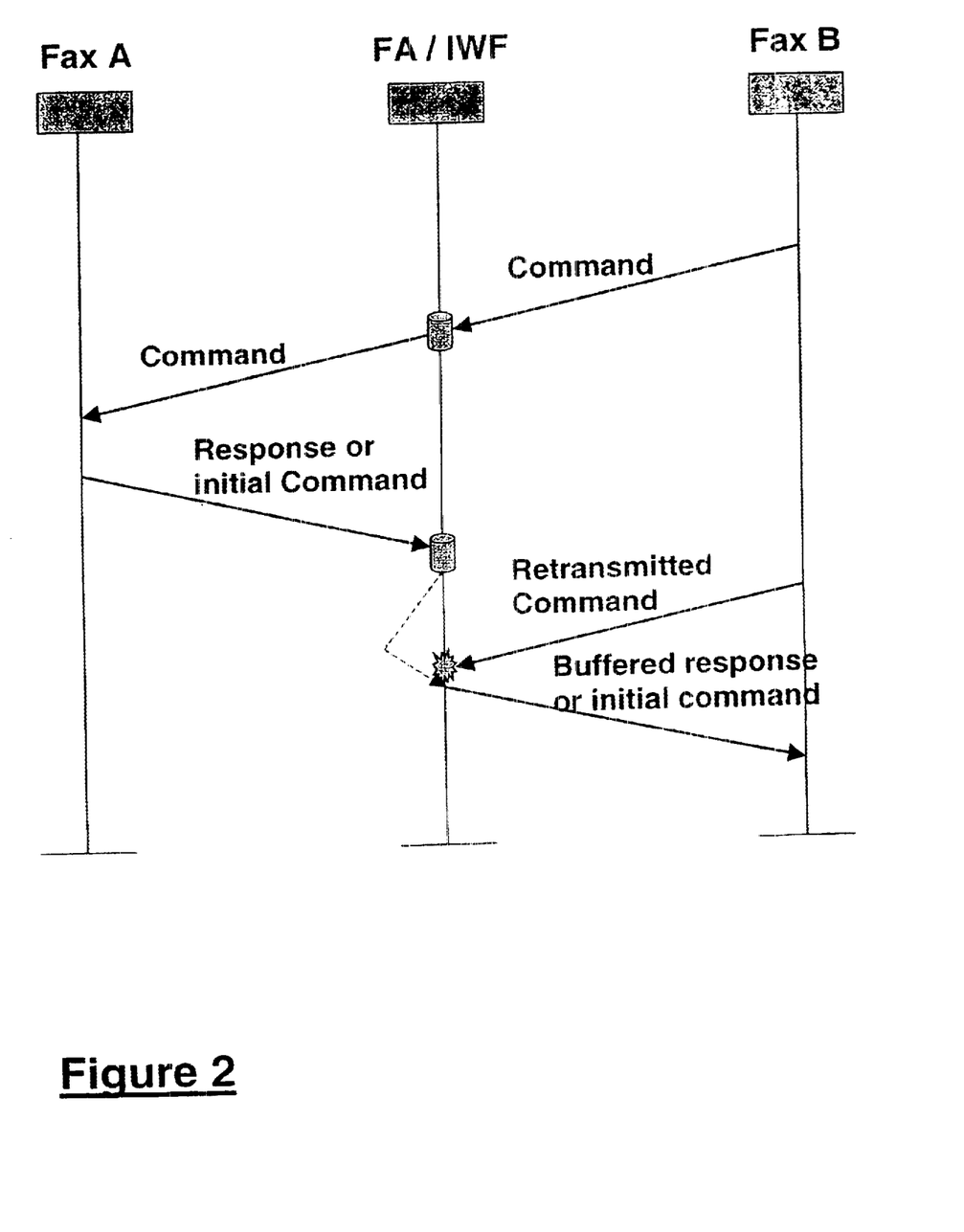
FIG. 2 is a schematical drawing illustrating the basic principle of an embodiment according to the present method.

FIG. 2 illustrates this basic principle. Note that the response of a command is a command itself before the identification procedure is completed.

Moreover, if the FA/IWF fails to receive a valid response before a timer TG1 expires, the command previously transmitted will be regenerated by the FA/IWF. Note that the regeneration requires buffering of commands that may have different format, whereas unique commands do not require buffering. To make it simple, it is suggested that all transmitted commands also are buffered. The timer TG1 is started when a command has been transmitted by the FA/IWF, and reset upon reception of a valid response. The value of TG1 must be chosen in accordance with the round-trip delay of the particular communication link. In addition, since some fax machines use very long time before responding to a command (up to 2000 ms has been seen), this must also be considered. While waiting for a valid response, any retransmitted command received will be ignored in the FA/IWF. A situation like the one described may occur if either a command transmitted by the FA/IWF or a response sent by the receiving terminal is lost on the communication link.

Figure 3:
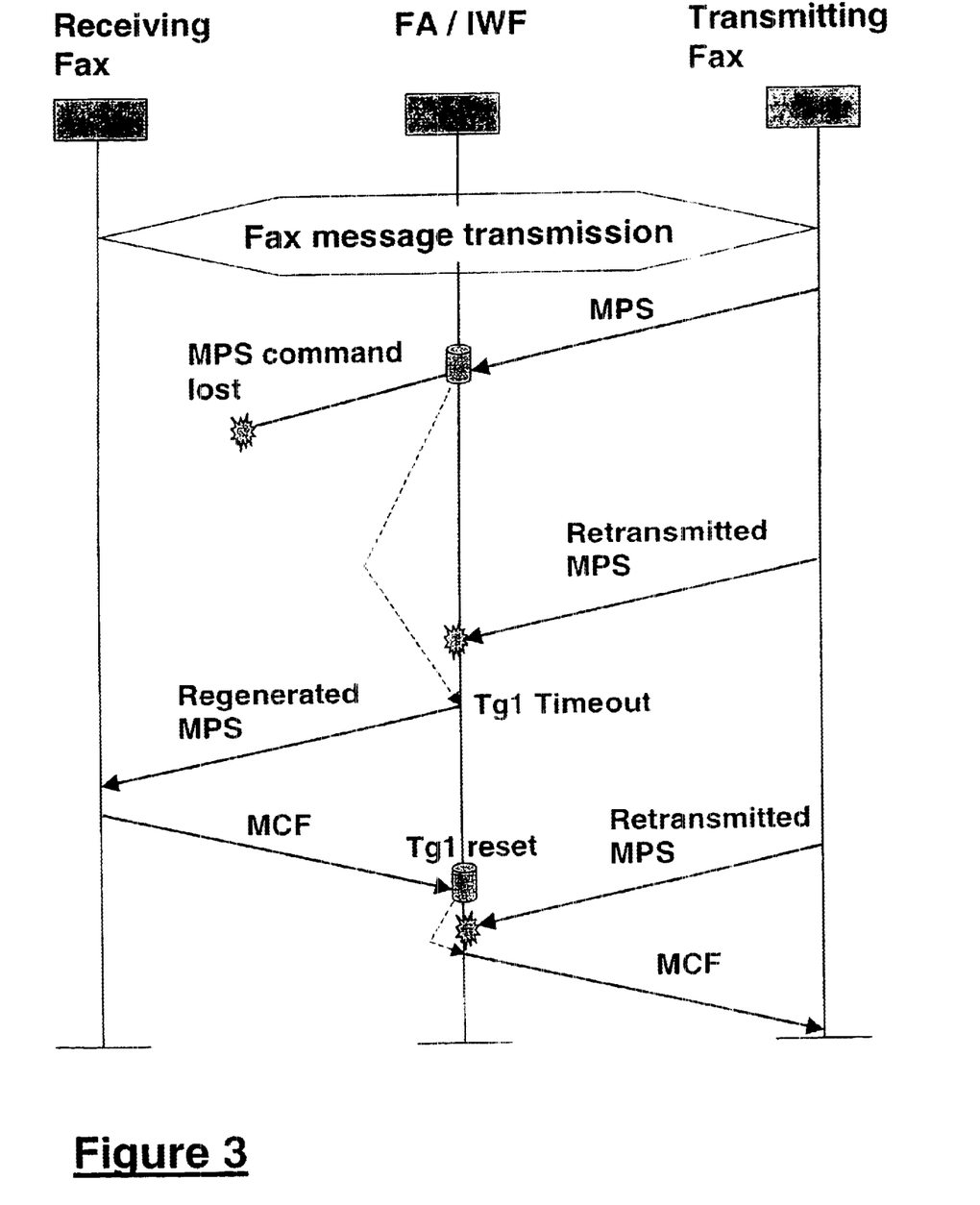
FIG. 3 is a schematical drawing illustrating the basic principle according to the present invention in connection with a second embodiment thereof.

FIG. 3 illustrates the principle of ignoring and regenerating commands during the post-message procedure where an MPS command is lost after it has been transmitted from the FA/IWF.

According to the T.30 recommendation, the receiving terminal will terminate the call if no valid command or message data has been received within 6 s±1 s, Timeout T2. For that reason, the FA/IWF starts a timer TG2 after having received a response that will trigger the transmitting terminal to initiate fax page data transmission, e.g. CFR, MCF. On timeout, the FA/IWF will start generating dummy message data towards the receiving terminal. This continues until real fax message data is received from the transmitting terminal. It is suggested to generate binary ones as dummy data instead of binary zeros for non-EMC calls. The reason for this is that an EOL pattern (11 zeros and a one) that always occurs prior to the first data line of a fax page, will be wrongly received if one of the transmitted zero bits toggles, and the receiving terminal starts decoding uncoded image data. If binary ones are transmitted, the receiving terminal will just discard the dummy data.

For ECM calls it is suggested that HNDLC flags are generated as dummy data.

Figure 4A:
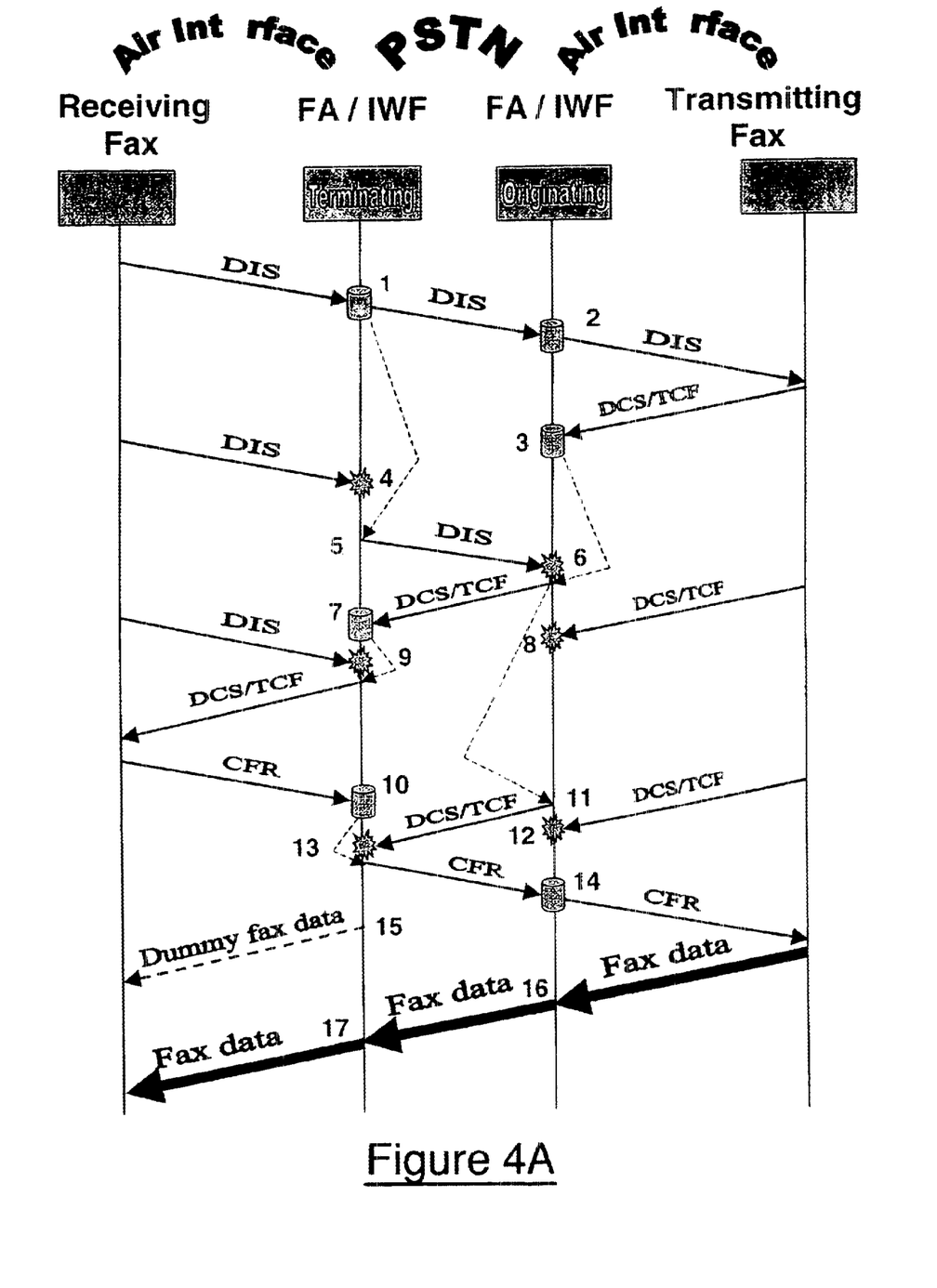
FIGS. 4A–4B illustrate a third embodiment wherein the basic principle of the present method is used, here in connection with an MT—MT call that involves two FA/IWFs.
Figure 4B:
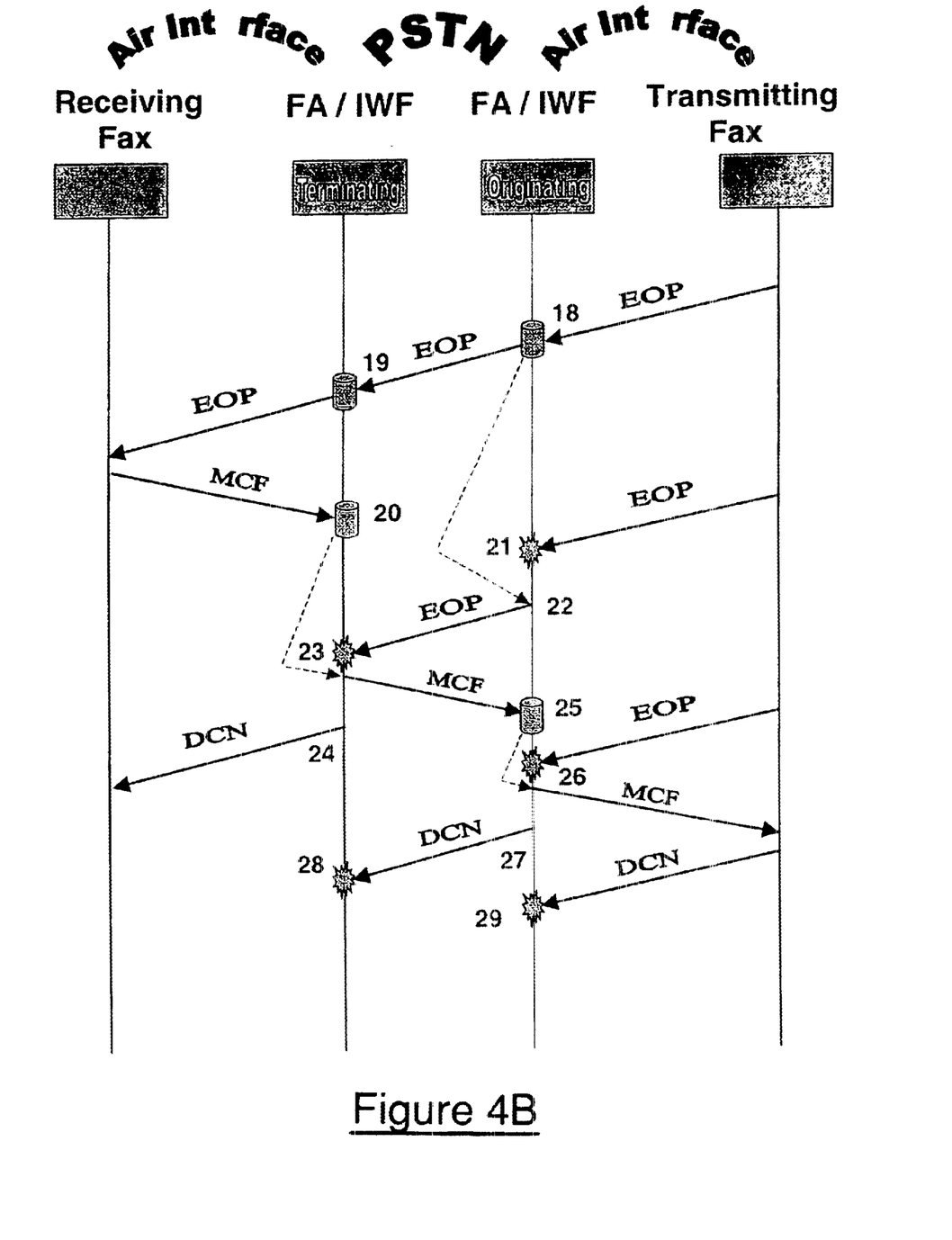

FIGS. 4A–4B show how the T.30 protocol is changed according to the proposed solution in an MT—MT call that involves modified FA/IWF.

EXPLANATION OF FIGS. 4A–4B

1. The terminating FA/IWF receives the initial DIS command from the digital air interface. The DIS command is immediately passed on to the originating side via the fixed network. The DIS command is also stored in a buffer. The TG1 timer is started.
2. The originating FA/IWF receives the initial DIS command from the fixed network side. The DIS command is immediately passed on to the originating fax via the air interface. The DIS command is also stored in a buffer. The TG1 timer is started.
3. The originating FA/IWF receives the first DCS/TCF sequence from the air interface, and stops/resets the TG1 timer. Both the DCS and the TCF are stored in a buffer.
4. The terminating FA/IWF receives the first retransmitted DIS, which is ignored.
5. The terminating FA/IWF gets TG1 timeout, and the buffered DIS is regenerated on to the originating side via the fixed network. The TG1 timer is started.
6. The originating FA/IWF receives a second DIS. The DIS is ignored, and the buffered DCS/TCF sequence is generated on to the terminating fax via the fixed network. The TG1 timer is started.
7. The terminating FA/IWF receives the initial DCS/TCF sequence, and stops/resets the TG1 timer. Both the DCS and the TCF are stored in a buffer.
8. The originating FA/IWF receives the first retransmitted DCS/TCF sequence, which is ignored.

9. The terminating FA/IWF receives the third DIS from the receiving fax. The DIS is ignored, and the buffered DCS/TCF sequence is generated on to the terminating fax via the air interface. The TG1 timer is started.
10. The terminating FA/IWF receives the CFR. The CFR is stored in a buffer. The TG2 timer is started. (Please note that the terminated fax does not retransmit the CFR.)
11. The originating FA/IWF gets TG1 timeout, and regenerates the buffered DCS/TCF sequence on to the terminating side via the fixed network. The TG1 timer is started.
12. The originating FA/IWF receives the third (and final) DCS/TCF sequence from the originating fax. The DCS/TCF sequence is ignored.
13. The terminating FA/IWF receives a second DCS/TCF sequence. The DCS/TCF sequence is ignored, and the buffered CFR is generated on to the originating side via the fixed network. Note that the TG1 timer is not started upon sending a response.
14. The originating FA/IWF receives the CFR from the fixed network, and stops/resets the TG1 timer. The CFR is immediately passed on to the originating fax via the air interface since 3 DCS/TCF sequences already have been received from the originating fax. The CFR response is also stored in a buffer and the TG2 timer is started.
15. The terminating FA/IWF gets TG2 timeout, and starts generating dummy fax data towards the terminating fax via the air interface.
16. The originating FA/IWF receives fax data from the originating fax, and stops/resets the TG2 timer. The fax data is immediately passed on to the terminating side via the fixed network.
17. The terminating FA/IWF receives fax data from the fixed network. The dummy data procedure is terminated, and the fax data is immediately passed on to the terminating fax via the air interface.
18. The originating FA/IWF receives the first EOP from the originating fax. The EOP is immediately passed on to the terminating side via the fixed network. The EOP is also stored in a buffer. The TG1 timer is started.
19. The terminating FA/IWF receives the first EOP, which immediately is passed on to the terminating fax via the air interface. The EOP is also stored in a buffer. The TG1 timer is started.
20. The terminating FA/IWF receives MCF from the terminating fax and stops/resets the TG1 timer. The MCF is stored in a buffer.
21. The originating FA/IWF receives the first retransmitted EOP from the originating fax. The EOP is ignored.
22. The originating FA/IWF gets TG1 timeout, and regenerates the buffered EOP on to the terminating side via the fixed network. The TG1 timer is started.
23. The terminating FA/IWF receives a second EOP. The EOP is ignored, and the buffered MCF is generated on to the originating side via the fixed network. Note that the TG1 timer is not started upon sending a response.
24. The terminating FA/IWF generates the DCN command towards the receiving fax after a short silence period. This can be done since the leas command transmitted was an EOP.
25. The originating FA/IWF receives the MCF and stops/resets the TG1 timer. The MCF is stored in a buffer.
26. The originating FA/IWF receives the third EOP from the originating fax. The EOP is ignored, and the buffered MCF is generated on to the originating fax via the air interface.
27. After a short silence period, the originating FA/IWF generates DCN towards the terminating side. This can be done since the last command sent from the originating fax, was an EOP.
28. The terminating FA/IWF receives DCN from the originating side. The DCN is ignored.
29. The originating FA/IWF receives DCN from the originating fax. The DCN is ignored.

Referring to FIGS. 4A–4B, it is obvious that special care would have been needed if the originating FA/IWF had not received the CFR response so short after ignoring the third retransmission of DCS/TCF. Hence, a TG3 timer is started after receiving a third retransmission of a command. At timeout, dummy HDLC flags (7E h) are generated by the FA/IWF in order to prevent the command issuing fax machine to disconnect the call. The HDLC flags will just be added as an extension to the preamble of the response the FA/IWF is waiting for. Any response received after a third retransmitted command has been received and ignored from the other side should immediately be passed on by the FA/IWF. Note that this applies even if the timer described above has not elapsed.

Another way of handling MT—MT calls that involve two modified FA/IWF's, is to deactivate the algorithm in one of the FA/IWF and let it run in normal GSM modus. The NSF signal, which is a non-standard facility signal defined in T.30 (section 5.3.6.1.1), can be used in this context. Before sending the DIS signal, the terminating FA/IWF adds the NSF signal (or alters it if received from receiving fax) containing a unique predefined code. When the originating FA/IWF receives this information, it knows that a terminating FA/IWF that is running the same algorithm exists, and hence, deactivates its algorithm. The rest of the fax transmission is from the modified FA/IWF point of view, the same as a mobile terminated call with extra long delay on the GSTN side.

ADVANTAGES

The main advantage with this solution is that it solves the problem with fax transmissions in telecommunication systems with long delays.

Furthermore, the solution is easy to implement and has impacts only to the FA/IWF. This means that a standard GSM FA/MT can be used on the mobile side. This reduces the total implementation costs compared to a solution that is implemented both in the FA/MT and in the FA/IWF.

BROADENING

The invention applies to the usage of transparent fax services in telecom systems with long delays and where a GSM based infrastructure is used. Typical areas where this solution can be used:

1. Fax transmissions over satellite networks where a GSM based infrastructure is used.
2. Fax transmissions over GSM networks. The method is particularly interesting for MT—MT calls where the total round-trip delay is long.

ABBREVIATIONS

GSM Global System for Mobile communication
PSTN Public Switched Telephone Network
PLMN Public Land Mobile Network
ISDN Integrated Service Digital Network
GSTN General Switched Telephone Network
FAX Facsimile
MT Mobile Terminal
FA Fax Adaptor
FA/IWF The Fax Adaptor specifically located at IWF side
FA/MT The Fax Adaptor specifically located at MT side
TCH Traffic Channel EOL End Of Line
CFR Confirmation to Receive
MCF Message Confirmation
CRP Command Repeat
DIS Digital Identification Signal
DCS Digital Command Signal
MPS MultiPage Signal
EOP End Of Procedures
NSF Non-Standard Facilities
IWF Inter Working Function
MSC Mobile Switching Centre
VLR Visitor Location Register
HDLC High Level Data Link Control
EMC Error Correction Mode

What is claimed is:

1. A method for handling long delays in telecommunication systems comprising the steps of:
receiving a first signal from a first station;
transmitting the first signal to a second station;
receiving a second signal from the second station, wherein the second signal is transmitted in response to the first signal;
buffering the second signal;
receiving from the first station at least one retransmitted first signal;
ignoring the retransmitted first signal;
transmitting the second signal to the first station;
wherein the first signal is retransmitted by the first station in response to a determination that the first station has not received an appropriate valid response to the first signal within a first time limit;
determining whether a valid response to the first signal has not been received from the second station before a predefined time TG1 has elapsed since the step of transmitting the first signal to the second station was performed;
if so determined, retransmitting the first signal to the second station;
wherein TG1 is predefined with reference to a round-trip delay between the first station and the second station;
starting a first timer in response to the step of transmitting the first signal to the second station;
resetting the first timer in response to receipt of a valid response to the first signal from the second station;
following the step of transmitting the first signal to the second station, ignoring any signal received from the first station until the second signal from the second station has been received;
starting a second timer in response to receipt of a response that triggers initiation of a fax-page data transmission;
transmitting dummy message data toward the second station upon expiration of a pre-defined time TG2 since the second timer was started;
receiving real fax-message data from the first station;
discontinuing transmission of the dummy message data in response to the step of receiving real fax-message data from the first station; and
wherein the dummy message data comprises binary ones for non-ECM calls and HDLC flags for ECM calls.

2. The method of claim 1 further comprising the steps of:
starting a third timer in response to receipt of a third retransmitted signal from the first station; and
transmitting dummy message data toward the second station upon expiration of a pre-defined time TG3 since the third timer was started, thereby preventing the first station from disconnecting.

3. The method of claim 2 wherein any response received from the second station after the third retransmitted signal from the first station is immediately transmitted to the first station.

4. A system for handling telecommunication delays comprising:
a first station adapted to transmit a first signal to a fax adaptor;
a fax adaptor adapted to:
receive the first signal from the first station;
transmit the first signal to a second station;
receive a second signal from the second station, wherein the second signal is transmitted in response to the first signal;
buffer the second signal;
receive from the first station at least one retransmitted first signal;
ignore the retransmitted first signal; and
transmit the second signal to the first station;
a second station adapted to receive the first signal and to transmit the second signal;
wherein the first station is adapted to retransmit the first signal in response to a determination that the first station has not received an appropriate valid response to the first signal within a first time limit;
wherein the fax adaptor is further adapted to:
determine whether a valid response to the first signal has not been received from the second station before a predefined time TG1 has elapsed since the transmission of the first signal to the second station; and
if so determined, retransmit the first signal to the second station;
wherein TG1 is predefined with reference to a round-trip delay between the first station and the second station;
wherein the fax adaptor is further adapted to:
start a first timer in response to the transmission of the first signal to the second station;
reset the first timer in response to receipt of a valid response to the first signal from the second station;
following the transmission of the first signal to the second station, ignore any signal received from the first station until the second signal from the second station has been received by the fax adaptor;
start a second timer in response to receipt of a signal that triggers initiation of a fax-page data transmission;
transmit dummy message data toward the second station upon expiration of a predefined time TG2 since the second timer was started;
receive real fax-message data from the first station; and
discontinue transmission of the dummy message data in response to receipt of real fax-message data from the first station;
wherein the dummy message data comprises binary ones for non-ECM calls and HDLC flags for ECM calls.

5. The system of claim 4 wherein the fax adaptor is further adapted to:
start a third timer in response to receipt of a third retransmitted signal from the first station; and
transmit dummy message data toward the second station upon expiration of a pre-defined time TG3 since the third time was started, thereby preventing the first station from disconnecting.

6. The system of claim 5 wherein any response received from the second station after the third retransmitted signal from the first station is immediately transmitted to the first station.

7. A method of handling long delays in telecommunication systems using at least one Fax Adapter/Inter Working Function (FA/IWF), the method comprising:

implementing a safe period, during which period no signal crash will occur if the at least one FA/IWF starts transmitting a T.30 signal on at least one of two communication links, by:

buffering a T.30 signal received from a first fax station (A); and passing the buffered T.30 signal received from A to a second fax station (B) in response to a retransmitted T.30 signal from the second fax station (B) having been received and ignored;

wherein, if the at least one FA/IWF does not receive a valid response before a timer (TG1) expires, a previously transmitted command is regenerated by the FA/IWF;

ignoring, by the FA/IWF, of any transmitted command received by the FA/IWF while the FA/IWF is waiting for a valid response;

wherein a second timer (TG2) is started in at least one of the at least one FA/IWF after receipt of a response that triggers a transmitting terminal to initiate fax page data transmission and dummy message data is generated towards a receiving terminal on timeout, the generation continuing until real fax message data is received from the transmitting terminal; and wherein binary ones are generated as dummy data for non-ECM calls and HDLC flags are generated as dummy data for ECM calls.

* * * * *